(12) United States Patent
Bender et al.

(10) Patent No.: US 11,855,984 B2
(45) Date of Patent: Dec. 26, 2023

(54) METHOD AND SYSTEM OF PROVIDING SECURE ACCESS TO A CLOUD SERVICE IN A CLOUD COMPUTING ENVIRONMENT

(71) Applicant: Siemens Aktiengesellschaft, Munich (DE)

(72) Inventors: Philipp Bender, Rülzheim (DE); Heiko Osigus, Kandel (DE); Sven Selle, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 475 days.

(21) Appl. No.: 17/126,490

(22) Filed: Dec. 18, 2020

(65) Prior Publication Data

US 2021/0105274 A1  Apr. 8, 2021

Related U.S. Application Data

(63) Continuation of application No. PCT/EP2019/066220, filed on Jun. 19, 2019.

(30) Foreign Application Priority Data

Jun. 19, 2018 (EP) .................... 18178618

(51) Int. Cl.
*H04L 9/40* (2022.01)
*H04L 41/22* (2022.01)
*H04L 67/00* (2022.01)

(52) U.S. Cl.
CPC ......... *H04L 63/0876* (2013.01); *H04L 41/22* (2013.01); *H04L 63/0807* (2013.01); *H04L 63/102* (2013.01); *H04L 67/34* (2013.01)

(58) Field of Classification Search
CPC . H04L 63/0876; H04L 41/22; H04L 63/0807; H04L 63/102; H04L 67/34;
(Continued)

(56) References Cited

U.S. PATENT DOCUMENTS 9,992,186 B1  6/2018  Drozd
11,303,623 B2 *  4/2022  Ducker ................... G06F 21/44
(Continued)

FOREIGN PATENT DOCUMENTS

CN  102739708 A  10/2012
CN  103179115 A  6/2013
(Continued)

OTHER PUBLICATIONS

European Search Report for European Application No. 18178618.7-1218 dated Nov. 20, 2018.

*Primary Examiner* — Huan V Doan
(74) *Attorney, Agent, or Firm* — Lempia Summerfield Katz LLC (57) ABSTRACT

A system and method are disclosed for providing secure access to a cloud service. In one embodiment, the method includes: receiving a request to access a cloud service hosted on a cloud computing system from a tenant device of a tenant; authenticating the tenant to access the requested cloud service via the application based on a tenant identifier and unique identifier associated with the cloud service; generating a ticket indicating that the tenant is authorized to access the application, wherein the ticket includes a unique identifier associated with the application associated with the requested cloud service; transmitting the ticket to the third-party server communicatively coupled to the cloud computing system; and providing access to the cloud service to the tenant via the application hosted on the third-party server in response to successful validation of the ticket by the third-party server.

17 Claims, 7 Drawing Sheets

(58) Field of Classification Search
CPC . H04L 63/0884; H04L 63/0815; H04L 67/10; H04L 67/125; G06F 2221/0711
See application file for complete search history.

(56) References Cited

U.S. PATENT DOCUMENTS

| | | |
|---|---|---|
| 2012/0096271 A1 | 4/2012 | Ramarathinam |
| 2013/0024919 A1 | 1/2013 | Wetter et al. |
| 2015/0012977 A1 | 1/2015 | Huh et al. |
| 2016/0065555 A1 | 3/2016 | Branden et al. |
| 2016/0277970 A1* | 9/2016 | Werneke ............. H04W 12/084 |
| 2018/0165386 A1 | 6/2018 | Soundiramourthy |

FOREIGN PATENT DOCUMENTS

| | | |
|---|---|---|
| CN | 103685267 A | 3/2014 |
| CN | 105074713 A | 11/2015 |
| CN | 106790240 A | 5/2017 |
| CN | 107005605 A | 8/2017 |
| CN | 108111473 A | 6/2018 |

\* cited by examiner

ME THOD AND SYSTEM OF PROVIDING
SECURE ACCESS TO A CLOUD SERVICE IN
A CLOUD COMPUTING ENVIRONMENT

The present patent document is a continuation of PCT Application Serial No. PCT/EP2019/066220, filed Jun. 19, 2019, designating the United States, which is hereby incorporated by reference, and this patent document also claims the benefit of European Patent Application No. 18178618.7, filed Jun. 19, 2018, which is also hereby incorporated by reference

TECHNICAL FIELD

The present disclosure relates to the field of cloud computing system and more particularly relates to providing secure access to a cloud service hosted on the cloud computing system.

BACKGROUND

With advent of cloud computing technology, a large number of devices (also commonly known as 'assets') are connected to a cloud computing system via the Internet. The devices may be located in a remote facility connected to the cloud computing system. For example, the devices may be equipment, sensors, actuators, robots, and/or machinery in an industrial set-up(s). The devices may be medical devices and equipment in a healthcare unit. The devices may be home appliances or office appliances in a residential/commercial establishment.

The cloud computing system may enable remote configuring, monitoring, controlling, and maintaining connected devices. Also, the cloud computing system may facilitate storing large amounts of data periodically gathered from the devices, analyzing the large amounts of data, and providing insights (e.g., Key Performance Indicators, Outliers) and alerts to operators, field engineers or owners of the devices via graphical user interface (e.g., web browser). The insights and alerts may enable controlling and maintaining the devices, leading to efficient and fail-safe operation of the devices. The cloud computing system may also enable modifying parameters associated with the devices and issues control commands via the graphical user interface based on the insights and alerts.

The cloud computing system may include a plurality of servers or processors (also known as 'cloud infrastructure'), which are geographical distributed, connected with each other via a network. A dedicated platform (hereinafter referred to as 'cloud platform') is installed on the servers/processors for providing above functionality as a service (hereinafter referred to as 'cloud service'). The cloud platform may include a plurality of software programs executed on one or more servers or processors of the cloud computing system to enable delivery of the requested service to the devices and its users (e.g., tenants).

One or more applications are required to deliver a cloud service to its tenants. In some instances, these applications may be proprietary and may be hosted on third-party servers. The third-party servers are servers which are not a part of cloud computing system and are managed and maintained by a third-party. These third-party servers are connected to the cloud computing system for delivering a cloud service to tenants using applications deployed therein. When an authorized tenant user requests a cloud service (e.g., data analytics and visualization service), the tenant user is redirected to a login page of the third-party server so that the tenant is authenticated before providing access to the applications hosted on the third-party server. The tenant user needs to enter log-in credentials in the log-in page. Upon which, the tenant user is authenticated by the third-party server based on the log-in credentials. This authentication process is required to be carried out in spite of the fact that the tenant user is separately authenticated by the cloud computing system, thereby causing inconvenience to the tenant user in accessing the cloud service.

In light of the above, there exists a need to provide a cloud computing system which may provide easy and secure access to cloud service via applications hosted on a third-party server.

BRIEF SUMMARY

Therefore, it is an object of the present disclosure to provide a cloud computing system for providing secure and easy access to cloud services via applications hosted on a third-party server. The scope of the present disclosure is defined solely by the appended claims and is not affected to any degree by the statements within this summary. The present embodiments may obviate one or more of the drawbacks or limitations in the related art.

The object of the present disclosure is achieved by a method of providing secure access to a cloud service to tenants of a cloud computing system via an application hosted on a third-party server. The method includes receiving, by a cloud computing system, a request to access a cloud service from a tenant device of a tenant. The request includes a tenant identifier associated with the tenant and a unique identifier associated with the requested cloud service. The requested cloud service is accessible via an application hosted on a third-party server communicatively coupled to the cloud computing system. For example, the application may be a visual analytics application and the cloud service may be a data analytics and visualization service. Furthermore, the method includes authenticating the tenant to access the requested cloud service via the application based on the tenant identifier and the identifier associated with the cloud service. Also, the method includes generating a ticket indicating that the tenant is authorized to access the application. The ticket includes a unique identifier associated with the application associated with the requested cloud service. The ticket is in a format compatible with the third-party server. The method includes transmitting the ticket to the third-party server communicatively coupled to the cloud computing system. Moreover, the method includes providing access to the cloud service to the tenant via the application hosted on the third-party server in response to successful validation of the ticket by the third-party server. The access to the cloud service is provided without a need to log-in by the tenant to access the application by the third-party server.

In an embodiment, the method may include determining whether the tenant is authorized to access the requested cloud service based on the tenant identifier and the identifier associated with the cloud service. If the tenant is authorized to access the requested cloud service, the method may include determining whether the tenant has a valid role and a valid permission to access the requested cloud service. If the tenant has the valid role and the valid permission to access the cloud service, the method may include generating an access token authorizing the tenant to access the cloud service.

In another embodiment, the method may include verifying the access token which authorizes the tenant to access the cloud service, wherein the access token includes the role and the permission granted for the tenant, and the tenant identifier associated with the tenant. The method may include determining whether the access token which authorizes the tenant to access the cloud service is successfully verified. The method may include generating the ticket indicating that the tenant is authorized to access the application associated with the cloud service if the access token is successfully verified.

In yet another embodiment, the method may include determining an application which may deliver the requested cloud service from a plurality of applications using the unique identifier associated with the cloud service. The method may include determining a third-party server which hosts the determined application from a plurality of third-party servers connected to the cloud computing system. The method may include transmitting the ticket to the determined third-party server communicatively coupled to the cloud computing system.

In further another embodiment, the method may include receiving at least one visual representation of data from the application hosted on the third-party server in response to successful validation of the ticket. The method may include rendering the received visual representation of data on a graphical user interface of the tenant device.

Therein, the method may include receiving a request to retrieve time-series data associated with at least one asset stored in a time-series database from the application associated with the requested cloud service. The method may include retrieving the time-series data associated with the at least one asset from the time-series database based on the received request. Furthermore, the method may include providing the retrieved time-service data associated with the at least one asset to the third-party server. Moreover, the method may include receiving the visual representation of the processed time-series data from the application associated with the requested cloud service. The method may include rendering the visual representation of the processed time-series data on the graphical user interface of the tenant device.

In retrieving the time-series data associated with the at least one asset based on the received request, the method may include accessing an appropriate application programming interface (API) configured for retrieving time-series data associated with the at least one asset based on the received request. The method may include retrieving the time-series data associated the at least one asset from the time-series database in response to accessing the respective application programming interface.

In providing the retrieved time-series data associated with the at least one asset to the third-party server, the method may include analyzing the retrieved time-series data associated with the at least one asset using at least one analytics algorithm. Then, the method may include sending result of analysis along with the analyzed time series data to the third-party server.

The object of the present disclosure is also achieved by a cloud computing system including one or more processing units, and at least one accessible memory coupled to the one or more processing units. The at least one accessible memory includes a cloud computing platform stored in the form of machine-readable instructions and executable by the one or more processing units. The cloud computing platform is capable of performing method acts described above.

The object of the present disclosure is also achieved by a system including a cloud computing system for providing secure access to at least one cloud service as described above, at least one third-party server including one or more applications and communicatively coupled to the cloud computing system, and one or more tenant devices communicatively to the cloud computing system. The one or more tenant devices are configured to accessing the cloud service via the one or more applications hosted on the third-party server. The at least one third-party server is configured to re-authenticate a tenant by validating a ticket indicating that the tenant is authorized to access one of the applications.

The object of the present disclosure is also achieved by a computer program product having machine-readable instructions stored therein, that when executed by at least one processing unit, cause the processing unit to perform method described above.

BRIEF DESCRIPTION OF THE DRAWINGS

The above-mentioned and other features of the present disclosure will now be addressed with reference to the accompanying drawings of the present disclosure. The illustrated embodiments are intended to illustrate, but not limit the disclosure.

The present disclosure is further described hereinafter with reference to illustrated embodiments shown in the accompanying drawings, in which.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

DETAILED DESCRIPTION

Figure 1:
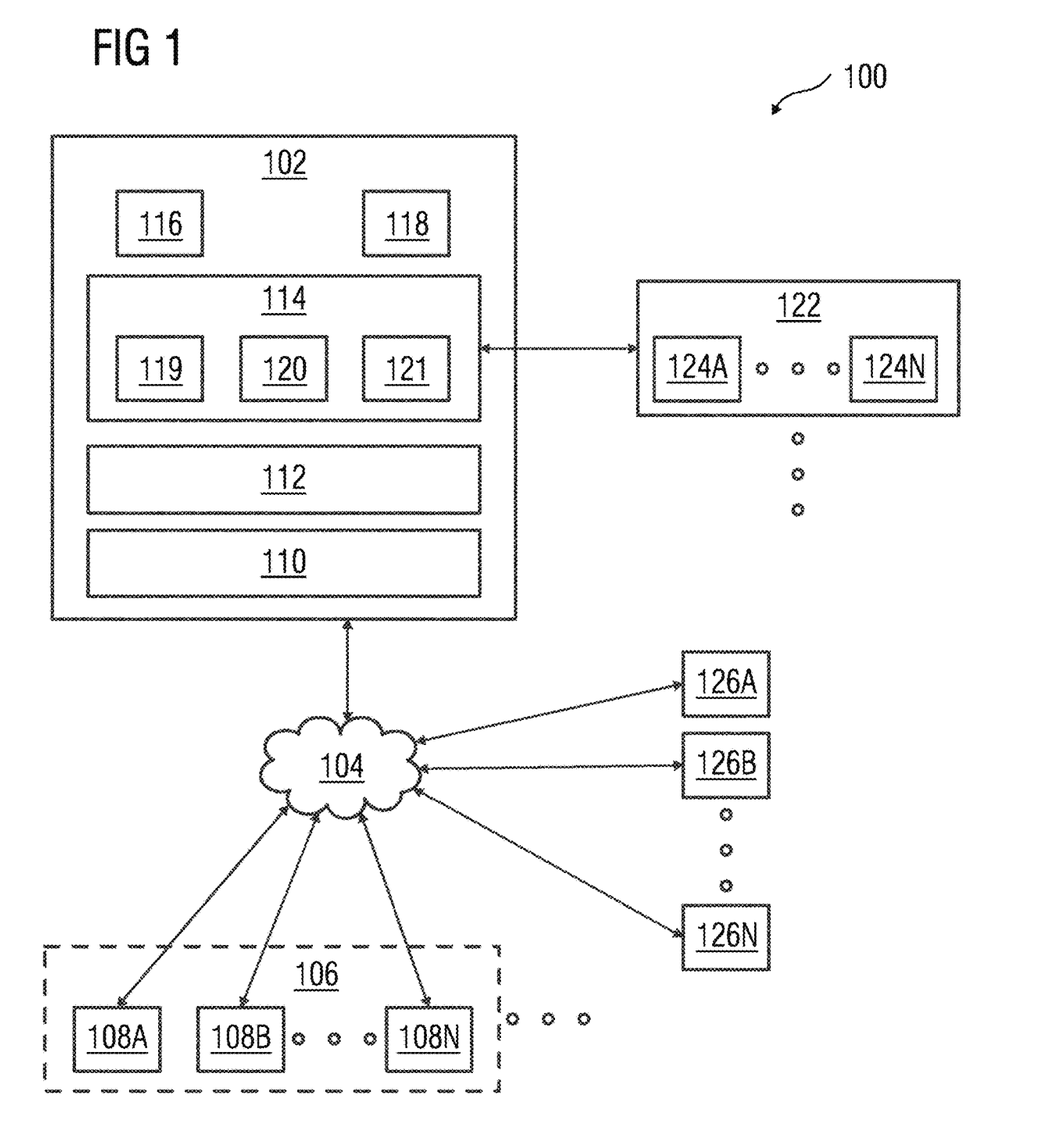
FIG. 1 is a schematic representation of a cloud computing environment, according to an embodiment.

FIG. 1 is a schematic representation of a cloud computing environment 100, according to an embodiment of the present disclosure. Particularly, FIG. 1 depicts the cloud computing system 102 capable of providing cloud services for managing an industrial plant 106 including assets 108A-N. The cloud computing system 102 is connected to assets 108A-N in the industrial plant 106 via a network 104 (e.g., Internet). The assets 108A-N may include servers, robots, switches, automation devices, motors, valves, pumps, actuators, sensors, and other industrial equipment. Although, FIG. 1 illustrates the cloud computing system 102 connected to a single industrial plant 106, one skilled in the art may envision that the cloud computing system 102 may be connected to several industrial plants 106 located at different locations via the network 104.

The cloud computing system 102 is also connected to tenant devices 126A-N via the network 104. The tenant devices 126A-N may access the cloud computing system 102 for accessing cloud services (e.g., visualization service). The tenant devices 126A-N may be a laptop computer, desktop computer, tablet computer, smart-phone, and the like. The tenant devices 126A-N may access cloud services (such as providing data analytics and visual analytics of assets 108A-N).

The cloud computing system 102 is communicatively connected to third-party servers 122 to deliver the cloud service to tenants via proprietary applications hosted on the third-party servers 122. The applications 124A-N may be visual analytics application which provides visual representation of time-series data of the assets 108A-N stored in the cloud computing system 102 to the tenants 106.

The cloud computing system 102 may be a public cloud, private cloud, or a hybrid cloud configured to provide dedicated cloud services to its tenants. The cloud computing system 102 includes a cloud interface 110, hardware resources and OS 112, and a cloud computing platform 114. The cloud interface 110 enables communication between the cloud computing system 102 and the industrial plants 106. Also, the cloud interface 110 enables communication between the cloud computing system 102 and the tenant devices 126A-N. The cloud interface 110 enables communication between the cloud computing system 102 and the third-party servers 122 or the applications 124A-N residing therein.

The hardware resources and OS 112 may include one or more servers on which an operating system (OS) is installed. The servers may include one or more processing units, one or more storage devices (e.g., memory units) for storing data (e.g., time-series database 118 with time-series data of assets 108A-N) and machine-readable instructions (e.g., application programming interfaces 116), and other peripherals required for providing cloud computing functionality.

The cloud computing platform 114 is a platform which enables functionalities such as data storage, data analysis, data visualization, data communication, etc. using the hardware resources and OS 112. The cloud computing platform 114 delivers the aforementioned cloud services using the application programming interfaces 116 deployed therein and the applications 124A-N hosted on the third-party servers 122. The cloud computing platform 114 may include a combination of dedicated hardware and software built on top of the hardware and OS 112.

The cloud computing platform 114 includes a data manager 119 which provides easy access to time-series data of the assets 108A-N stored in the time-series database 118 via the application programming interfaces 116. The data access manager 119 is stored in the form of machine-readable instructions stored on the cloud computing system 102, executable by the processors. The cloud computing system 102 includes an access control module 120 configured to authenticate a tenant user to access a requested cloud service based on the role and the permissions assigned to the tenant user when a request to access the cloud service is received from the tenant user. The access control module 120 is configured to generate an access token for providing access to the requested cloud service. The access token may include the role and the associated permissions granted to the tenant user, the tenant identifier of the tenant user, and the identifier of the cloud service. The cloud computing system 102 includes a ticket management system 121 configured to generate a ticket indicating the tenant user is authorized to access the requested cloud service. The cloud service may be accessed via one of the applications 124A-N hosted on the third-party server 122. The ticket is in a format compatible with the third-party server 122. Based on the ticket, the third-party server 122 validates the ticket issued for the tenant user and performs the requested operation via the application hosted therein. Thus, a need to log-in to the third-party server 122 to access the cloud service via the application hosted on the third-party server 122 is eliminated. For example, the third-party server 122 access the time-series data and analytics services for analyzing the time-series data from the cloud computing system 102 and provides visual analytics of the time-series data to the tenant user. The acts performed to provide secure and easy access to a cloud service via an application hosted on a third-party server 122 is explained in greater detail in the description that follows.

Figure 2:
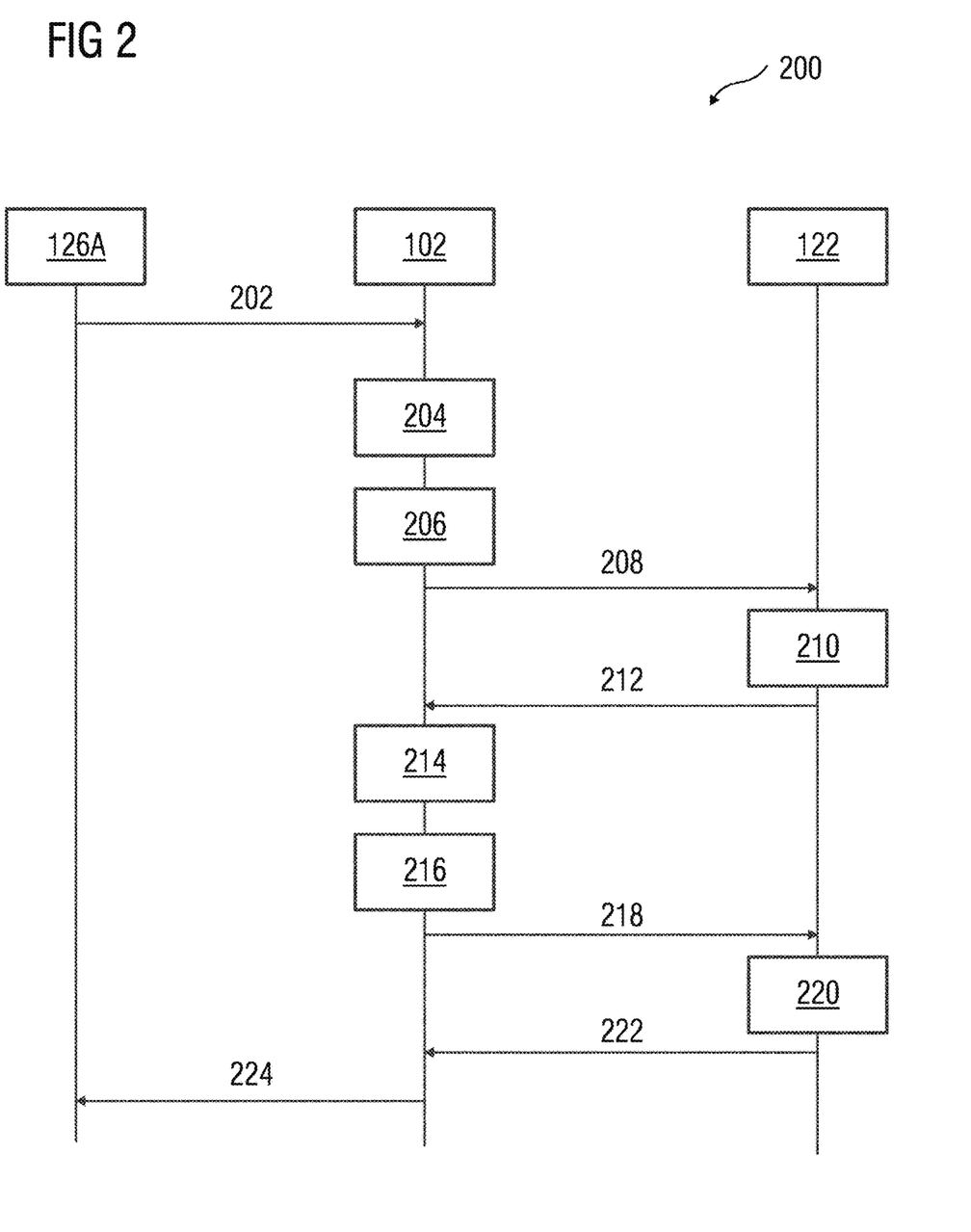
FIG. 2 is a flow diagram illustrating a method of providing secure access to cloud service to tenants of the cloud computing system via the applications hosted on the third-party server, according to an embodiment.

FIG. 2 is a flow diagram 200 illustrating a method of providing secure access to cloud service to tenants 106 of the cloud computing system 102 via the applications 124A-N hosted on the third-party server 122, according to an embodiment. At act 202, a tenant device 126A sends a request to access a cloud service hosted on the cloud computing system 102. The request includes a tenant identifier associated with the tenant 106, and a unique identifier associated with the requested cloud service. For example, the cloud service may be a data analytics and visualization service. The requested cloud service is accessible via a visual analytics application hosted on the third-party server 122 communicatively coupled to the cloud computing system 102.

At act 204, the cloud computing system 102 authenticates the tenant 106 to access the requested cloud service via the visual analytics application based on the tenant identifier and the identifier associated with the cloud service. In some embodiments, the access control module 120 determines whether the tenant 106 is authorized to access the requested cloud service based on the tenant identifier and the identifier associated with the cloud service. If the tenant 106 is authorized to access the requested cloud service, the access control module 120 determines whether the tenant 106 has a valid role and a valid permission to access the requested cloud service. If the tenant 106 has the valid role and the valid permission to access the cloud service, the access control module 120 generates an access token authorizing the tenant 106 to access the cloud service.

At act 206, the cloud computing system 102 generates a ticket indicating that the tenant 106 is authorized to access the visual analytics application. In some embodiments, the ticket management module 121 verifies the access token which authorizes the tenant 106 to access the cloud service. The access token includes the role and the permission granted for the tenant 106, and the tenant identifier associated with the tenant 106. Then, the ticket management module 121 determines whether the access token which authorizes the tenant 106 to access the cloud service is successfully verified. If the access token is successfully verified, the ticket management module 121 generates the ticket indicating that the tenant 106 is authorized to access the visual analytics application associated with the cloud service. The ticket is generated in a format compatible with the third-party server 122 such that the ticket enables automatic authentication of the tenant 106 at the third-party server 122. The ticket includes a unique identifier associated with the visual analytics application.

At act 208, the cloud computing system 102 transmits the ticket to the third-party server 122 communicatively coupled to the cloud computing system 102. In some embodiments, the ticket management module 121 determines a visual analytics application 124A which may deliver the requested cloud service from a plurality of applications 124A-N using the unique identifier associated with the cloud service. Then, the ticket management module 121 determines a third-party server 122 which hosts the determined visual analytics application 124A from a plurality of third-party servers connected to the cloud computing system 102. Accordingly, the ticket management module 121 transmits the ticket to the determined third-party server 122.

At act 210, the third-party server 122 verifies the ticket indicating that the tenant 106 is authorized to access the visual analytics application. If the ticket is successfully verified, at act 212, the third-party server 122 sends a request for time-series data of the asset 108A (e.g., motor) associated with the tenant 106 to the cloud computing system 102. At act 214, the cloud computing system 102 retrieves the time-series data of the asset 108A from the time-series database 118 based on the received request. In some embodiments, the data manager 119 accesses an appropriate application programming interface (API) 116 configured for retrieving time-series data of the asset 108A based on the received request. The data manager 119 retrieves the time-series data of the asset 108A from the time-series database 118 via the respective application programming interface 116.

At act 216, the cloud computing system 102 analyzes the retrieved time-series data of the asset 108A using one or more analytics algorithms. For example, the one or more analytics algorithms may be big data analytics algorithms. At act 218, the cloud computing system 102 sends the result of analysis along with the analyzed time series data to the third-party server 122.

At act 220, the third-party server 122 generates a visual representation of the time-series data of the asset 108A based on the result of analysis and the analyzed time-series data. For example, the third-party server 122 generates the visual representation of the analyzed time-series data of the asset 108A based on visual analytics algorithms. At act 222, the third-party server 122 sends the visual representation of the analyzed time-series data of the asset 108A to the cloud computing system 102. At act 224, the cloud computing system 102 renders the visual representation of the analyzed time-series data of the asset 108 on a graphical user interface of the tenant device 126A. The visualization of the time-series data provides deeper insights into performance/condition of the asset 108A. The deeper insights into performance/condition of the asset 108A may enable operator or field engineer to take further actions for efficient operation of the asset 108A and the industrial plant 106. In this manner, the cloud computing system 102 provides secure access to a third-party application without a need to manually re-authenticating a tenant at the third-party server 122 (e.g., via a log-in page) to access the third-party application provided by the third-party server 122.

For example, the tenant user 210A may want to check performance of a motor (e.g., the asset 108A) in the industrial plant 106. In such a case, the tenant user requests for performance data of the motor collected for a specific time period to the cloud computing system 102. The cloud computing system 102 sends a request to perform the requested operation to the visual analytics application 124A hosted on the third-party server 122 along with a ticket authorizing the tenant user access the visual analytics application 124A. The visual analytics application 124A validates the ticket and requests raw/aggregated performance data of motor and its analysis from the cloud computing system 102 if the ticket is successfully validated. Advantageously, the cloud computing system 102 does not redirect the tenant user to a log-in page of the third-party server wherein the tenant user is re-authenticated based on log-in credentials entered by the tenant user into the log-in page displayed on the tenant device 126A. Instead, the third-party server 122 processes the request from the tenant user based on the ticket issued by the cloud computing system 102, thereby eliminating a need to enter log-in credentials by the tenant user for authentication at the third-party server 122. Accordingly, the visual analytics application 124A generates visual representation of the performance data of the motor based on the analysis received from the cloud computing system 102. Then, the visual analytics application 124A sends a response including the performance data of the motor to the cloud computing system 102. The cloud computing system 102 renders visual representation of the performance data of the motor on a web page displayed on the tenant device 126A. One skilled in the art may understand that several such operations may be requested and performed by the cloud computing system 102 via the applications 124A-N hosted on the third-party server 122 during the active session based on the roles and associated permissions assigned to the tenant user.

Figure 3:
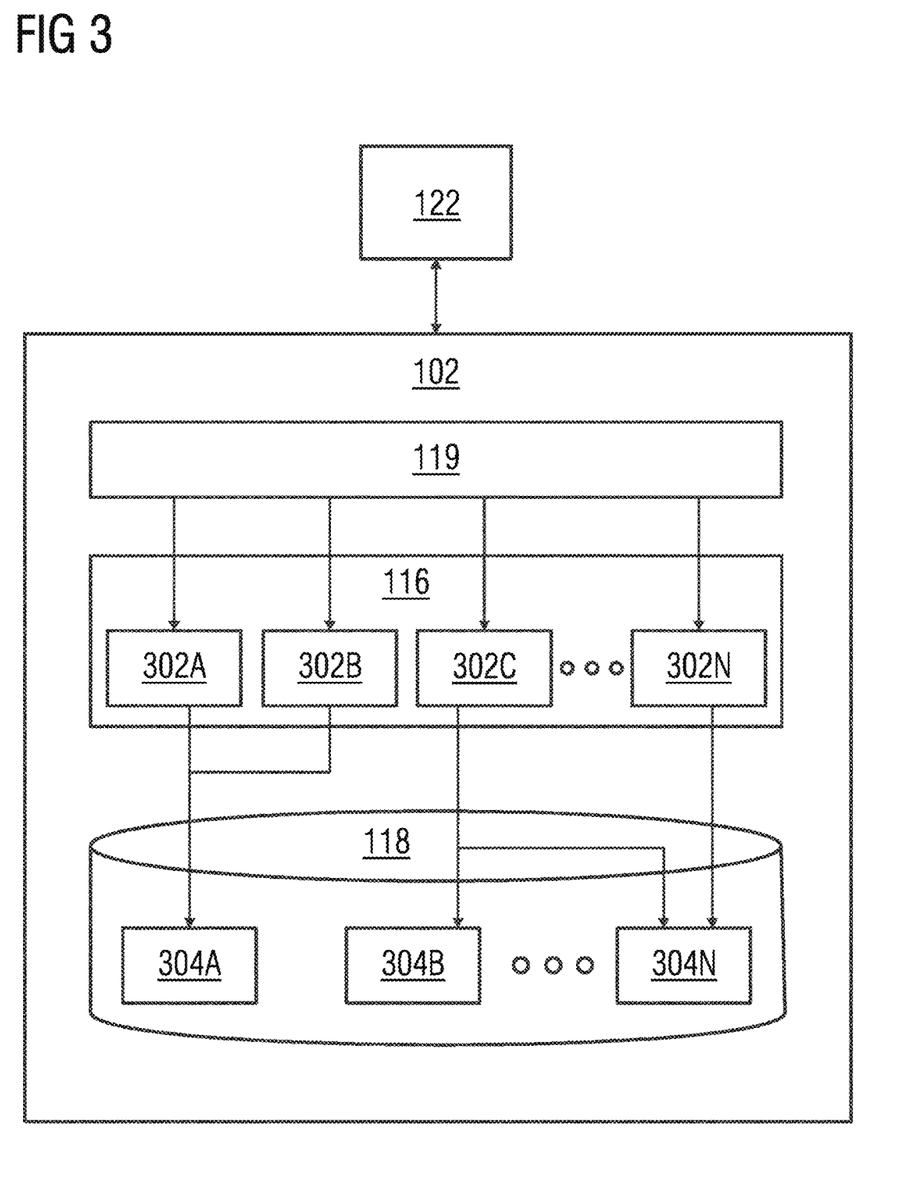
FIG. 3 is a schematic representation of components of the cloud computing system configured to provide time-series data of assets to the third-party server, according to an embodiment.

FIG. 3 is a schematic representation 300 of components of the cloud computing system 102 configured to provide time-series data of assets 108A-N to the third-party server 122, according to an embodiment. As shown in FIG. 3, the cloud computing system 102 enables users to monitor performance/condition of assets 108A-N. The cloud computing system 102 employs the data access manager 119, the APIs 116, and the time-series database 118. The API 116 employs functions 302A-N which enables the data manager 119 to access time-series data of the assets 108A-N from the time-series database 118. The time-series database 118 includes data models 304A-N which stores raw and/or aggregated data of the assets 108A-N. It may be noted that each of the data models 304A-N stores time-series data of particular asset or industrial plant. Also, each of the functions 302A-N is configured to access one or more data models 304A-N in the time-series database 118.

In an exemplary operation, the data manager 119 receives a request for retrieving time-series data of an asset 108A from the time-series database 118. Accordingly, the data manager 119 generates an API call based on the received request. The API call may indicate an asset identifier, one or more aspect information, time period for which time-series data to be retrieved, etc. The data manager 119 forwards the API call to the appropriate API 116 responsible for retrieving time-series data from the time-series database 118.

The API 118 invokes one of the functions 302A-N to retrieve the time-series data of the asset 108A based on the received API call. For example, the API 118 determines an asset identifier associated with the asset 108A whose time-series data is requested from the API call. Then, the API 118 determines a data model which stores the requested time-series data of the asset 108A from the plurality of data models 304A-N stored in the time-series database 118. Finally, the API 116 determines one of the functions 302A-N which is configured to access the determined data model. For the purpose of illustration, consider that the data model 304A stores the requested time-series data of the asset 108A. It may be seen from FIG. 3 that the function 302A and the function 302B may access the data model 304A. In such situations, the API 116 may invoke any of the available functions 302A and 302B. Let us consider that, the API 116 invokes the function 302A to access the data model 304A. Accordingly, the function 302A is executed based on the API call. As a result, the function 302A accesses the data model 304A and retrieves the requested time-series data of the asset 108A. The retrieved time-series data may be of particular data type and for time period specified in the API call. The API 116 returns the retrieved time-series data of the asset 108A to the data manager 119. The data manager 119 may analyze the retrieved time-series data and provide the result of analysis and/or the analyzed time-series data of the asset 108A to the third-party server 122 in a compatible format.

Figure 4:
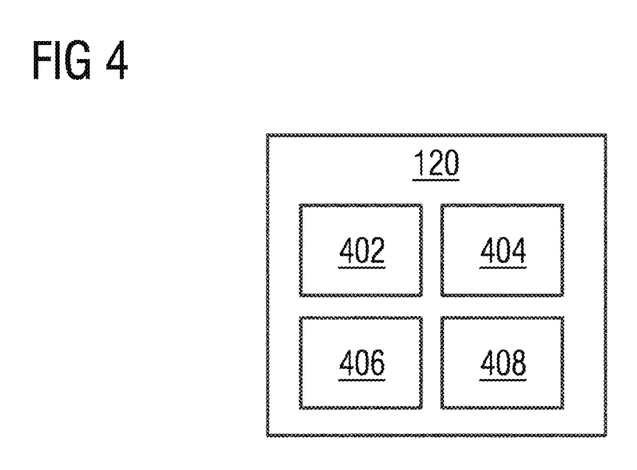
FIG. 4 illustrates a block diagram of the access control module for managing access to a cloud service by authorized tenant user, according to an embodiment.

FIG. 4 illustrates a block diagram of the access control module 120 for managing access to a cloud service by authorized tenant user, according to an embodiment. The access control module 120 includes a gateway module 402, an identity module 404, an authorization module 406, and an authentication module 408.

The gateway module 402 is configured to determine whether a valid session is established with a tenant device (e.g., the device 126A) of a tenant user to access the cloud service. The valid session indicates that the tenant user is authenticated. The gateway module 402 is configured to determine whether the tenant associated with the tenant user has valid subscription to access the cloud service. The gateway module 402 is configured to retrieve an access token associated with the session if the session is valid and subscription is valid.

The identity module 404 is configured to determine roles and permissions assigned to the tenant user. The identity module 404 is configured to generate a response including the roles and permissions assigned to the tenant user.

The authorization module 406 is configured to determine whether the roles and permissions assigned to the tenant user matches with at least one role and associated permission defined for the cloud service. In other words, the authorization module 406 determines whether the tenant user is authorized to access the requested cloud service based on the roles and permission assigned to the tenant user. The authorization module 406 is configured to generate an access token including the roles and permissions of the tenant user and the identifier associated with the cloud service if the tenant user is authorized to access the cloud service.

The authentication module 408 is configured to perform initial authentication of a tenant user based on valid credentials of the tenant user for accessing cloud services. For example, the valid credentials may be username and password combination or two factor authentication.

Figure 5:
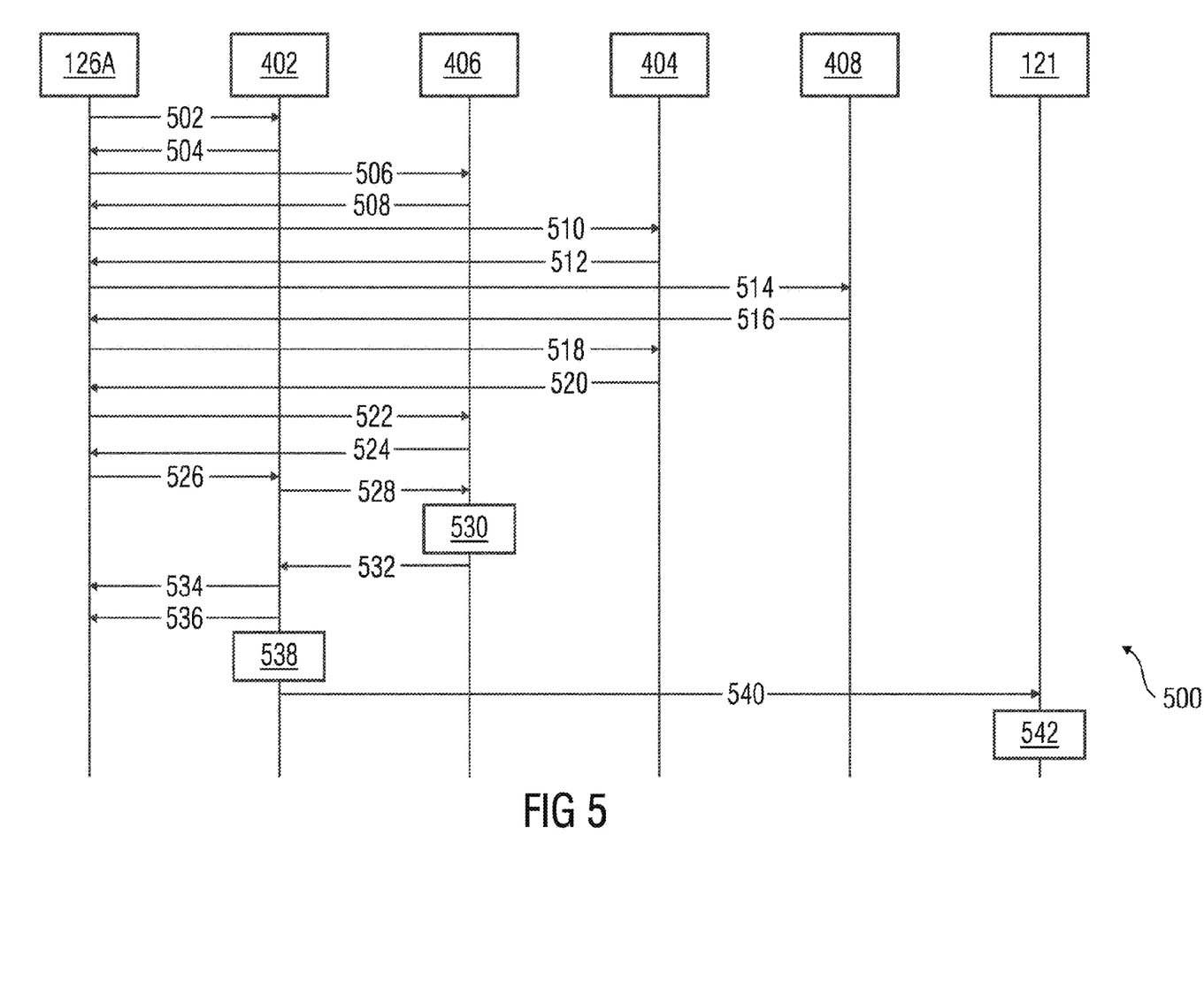
FIG. 5 is a flow diagram illustrating an exemplary method of providing access to a cloud service to authorized tenant users, according to an embodiment.

FIG. 5 is a flow diagram 500 illustrating an exemplary method of providing access to a cloud service to authorized tenant users, according to an embodiment. Consider that a tenant user is trying to access a cloud service (e.g., data analytics and visualization service) via an application 124A (e.g., visual analytics application) hosted on a third-party server 122 from a tenant device 126A (e.g., using a web browser). For example, the data analytics and visualization service may enable monitoring performance of assets 108A-N in an industrial plant 106 (e.g., condition monitoring of a motor). At act 502, the tenant device 126A sends a request to provide access to the cloud service to the cloud computing system 102. The request includes a tenant identifier of the tenant user 210A and an identifier of the cloud service. At act 504, the gateway module 404 determines that there is no valid session with the tenant device 126A and redirects the request back to the tenant device 126A. At act 506, the tenant device 126A redirects the request to the authorization module 406. At act 508, the authorization module 406 determines that there is no valid session with the tenant device 126A and redirects the request back to the tenant device 126A.

At act 510, the tenant device 126A redirects the request to the identity module 404. At act 512, the identity module 404 determines that there is no valid session with the tenant device 126A and redirects the request to the tenant device 126A. At act 514, the tenant device 126A redirects the request to the authentication module 408. At act 516, the authentication module 408 authenticates the tenant user based on valid login credentials and sends an authentication response to the tenant device 126A.

At act 518, the tenant device 126A forwards the authentication response from the authentication module 408 to the identity module 404. At act 520, the identity module 404 determines a role and permissions assigned to the tenant user to access the cloud service and sends a response with the assigned role and associated permissions to the tenant device 126A.

At act 522, the tenant device 126A sends the response with a role and permissions assigned to the tenant user to the authorization module 406. At act 524, the authorization module 406 redirects the tenant device 126A to an application callback endpoint. At act 526, the tenant device 126A sends a request to the application callback endpoint to the gateway module 402. At act 528, the gateway module 402 sends a request to issue an access token for providing access to the cloud service to the tenant device 126A. At act 530, the authorization module 406 generates an access token of the session with the tenant device 126A. The access token defines role and permission granted to the tenant user to access the cloud service via the application 124A hosted on third-party server 122. The role and permissions are granted to the tenant user based on the role and permissions assigned to the tenant user by the tenant 106, and the role and permissions defined for the cloud service.

At act 532, the authorization module 406 sends the access token to the gateway module 402. Also, the authorization module 406 stores the access token so that the access token may be reused for authorizing the tenant user to access the cloud service during the current session. Advantageously, this would save time and efforts to re-authenticate and re-authorize the tenant user for providing access to the cloud service during the ongoing session.

At act 534, the gateway module 402 sends the access token associated with the tenant user along with the request to access the cloud service via the application 126A residing on the third-party server 122 to the ticket management module 121. At act 536, the ticket management module 121 generates a ticket indicating the tenant user is authorized to access the application 124A residing on the cloud service based on the access token received from the gateway module 402.

Figure 6:
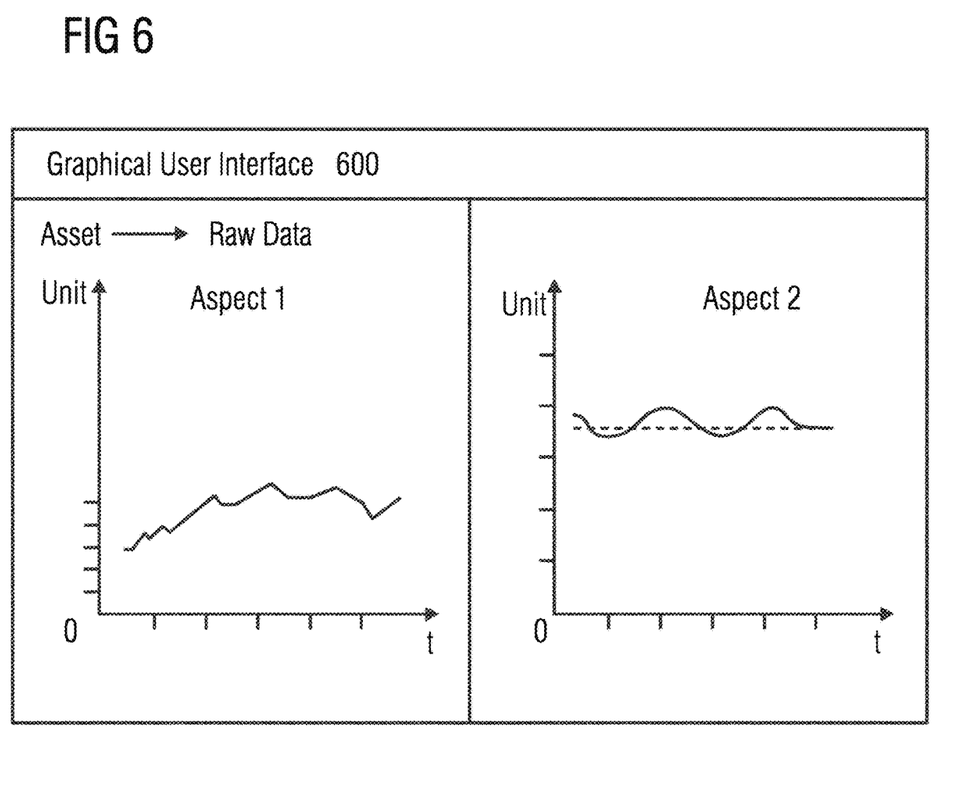
FIG. 6 is a schematic representation of a graphical user interface displaying a visual representation of time-series data of an asset, according to an embodiment.

FIG. 6 is a schematic representation of a graphical user interface 600 displaying a visual representation of time-series data of an asset. The graphical user interface view 600 displays visual representation of time-series data for an aspect 1 and an aspect 2 associated with an asset (e.g., motor). The visual representation facilitates the tenant user to monitor performance of the asset and take necessary actions for efficient and fail-safe operation of the industrial plant 106.

Figure 7:
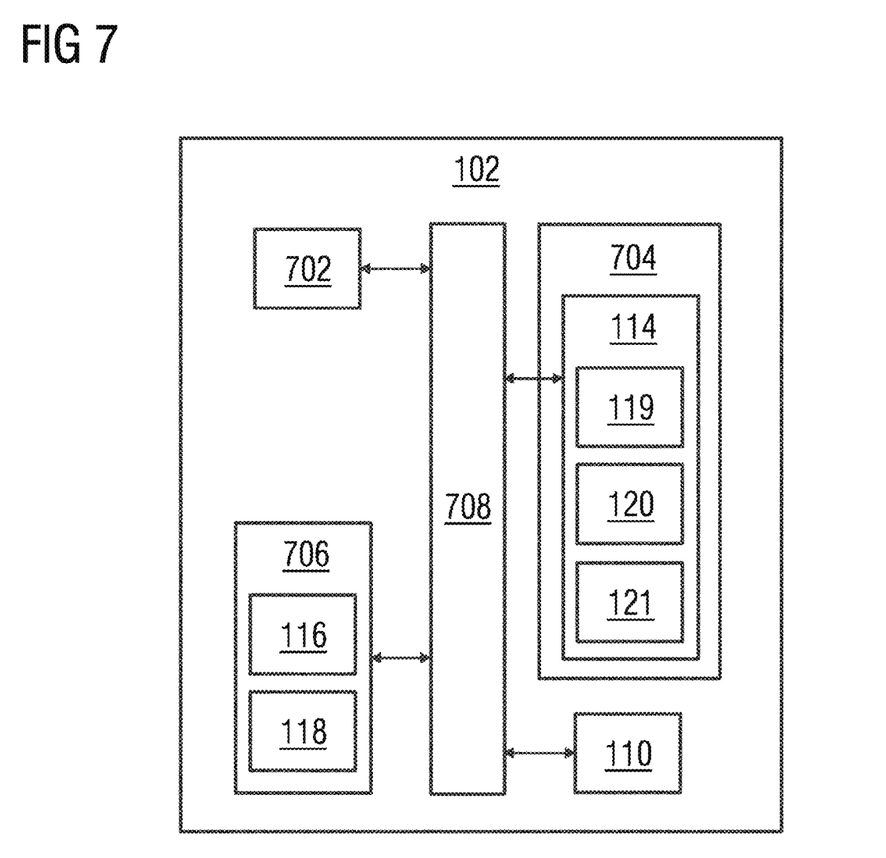
FIG. 7 illustrates a block diagram of the cloud computing system, according to an embodiment.

FIG. 7 illustrates a block diagram of the cloud computing system 102 such as those shown in FIG. 1, according to an embodiment. The cloud computing system 102 includes processors 702, at least one accessible memory unit 704, a storage unit 706, a cloud interface 110, and an interface 708. The memory unit 704 includes a data manager 119, an access control module 120, and a ticket management module 121 stored in the form of machine-readable instructions and executable by the processor(s) 702. Alternatively, the data manager 119, the access control module 120, and the ticket management module 121 may take a form of hardware such as a processor with embedded software.

The processor(s) 702 may be one or more processing units (e.g., servers) capable of processing requests from the tenant 106. The processor(s) 702 is also capable of executing machine-readable instructions stored on a computer-readable storage medium such as the memory unit 704 for performing various functions such as processing time-series data, analyzing time-series data, providing visualization of the analyzed time-series data, managing the tenants 106 and the assets 108A-N (e.g., authentication, communication, upgradation, etc.) and so on. The memory unit 704 includes the cloud computing platform 114 stored in the form of machine-readable instructions and executable by the processors 704. The cloud computing platform 114 includes the data manager 119, the access control module 120, and the ticket management module 121. When executed by the processor(s) 702, the cloud computing platform 114 enables the processor(s) 702 to provide secure access to a cloud service (e.g., data analytics and visualization service) via an application 124A hosted on the third-party server 122 based on a request from a tenant device 126A. Advantageously, the processor(s) 702 provides secure access to the tenant 106 without providing login credentials (e.g., username and password) in a login page of the third-party server 122. The processor(s) 702 generates a ticket indicating that the tenant 106 is authorized to access the cloud service associated with the application 124A residing in the third-party server 122. Accordingly, the third-party server 122 validates the ticket, resulting in automatic authentication of the tenant, thereby eliminating a need to sign-in in the login page of the third-party server 122.

The storage unit 706 may be volatile or non-volatile storage. In one embodiment, the storage unit 706 is configured to store a time-series database 118. The storage unit 706 may also store cloud applications, software and firmware, asset models, and IoT data models, digital twins of the industrial plant 106 and the assets 108A-N, visualization templates, big data analytics algorithms, application programming interfaces, and so on.

The cloud interface 110 is configured to establish and maintain communication links with the assets 108A-N including IoT edge devices. Also, the cloud interface 110 is configured to maintain a communication channel between the cloud computing platform 114 and the tenant devices 126A-N. The cloud interface 110 is also configured to manage communication with the third-party server 122. The interface 708 acts as an interconnect between different components of the cloud computing system 102.

The present disclosure may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described in detail with reference to certain embodiments, the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

The invention claimed is:

1. A method of providing secure access to a cloud service to a tenant of a cloud computing system via applications hosted on a third-party server, the method comprising:
   receiving, by the cloud computing system, a request to access a cloud service hosted on the cloud computing system from a tenant device of the tenant, wherein the request comprises a tenant identifier associated with the tenant device and a unique identifier associated with the requested cloud service, wherein the requested cloud service is accessible via an application hosted on the third-party server communicatively coupled to the cloud computing system;
   authenticating the tenant device to access the requested cloud service via the application based on the tenant identifier and the unique identifier associated with the cloud service;
   generating a ticket indicating that the tenant device is authorized to access the application, wherein the ticket comprises a unique identifier associated with the application associated with the requested cloud service;
   transmitting the ticket to the third-party server communicatively coupled to the cloud computing system; and
   providing access to the cloud service to the tenant device via the application hosted on the third-party server in response to successful validation of the ticket by the third-party server.

2. The method of claim 1, wherein the authenticating of the tenant device comprises:
- determining whether the tenant device is authorized to access the requested cloud service based on the tenant identifier and the unique identifier associated with the cloud service;
- determining whether the tenant device has a valid role and a valid permission to access the requested cloud service when the tenant device is authorized to access the requested cloud service; and
- generating an access token authorizing the tenant device to access the cloud service when the tenant device has the valid role and the valid permission to access the cloud service.

3. The method of claim 2, wherein the generating of the ticket comprises:
- verifying the access token which authorizes the tenant device to access the cloud service, wherein the access token comprises the valid role and the valid permission granted for the tenant device, and the tenant identifier associated with the tenant device;
- determining whether the access token which authorizes the tenant device to access the cloud service is successfully verified; and
- generating the ticket indicating that the tenant is authorized to access the application associated with the cloud service when the access token is successfully verified.

4. The method of claim 3, wherein the transmitting of the ticket comprises:
- determining an application configured to deliver the requested cloud service from a plurality of applications using the unique identifier associated with the cloud service;
- determining a third-party server which hosts the determined application from a plurality of third-party servers connected to the cloud computing system; and
- transmitting the ticket to the determined third-party server communicatively coupled to the cloud computing system.

5. The method of claim 4, wherein the providing of the access comprises:
- receiving at least one visual representation of data from the application hosted on the third-party server in response to the successful validation of the ticket; and
- rendering the received visual representation of data on a graphical user interface of the tenant device.

6. The method of claim 1, wherein the generating of the ticket comprises:
- verifying an access token which authorizes the tenant device to access the cloud service, wherein the access token comprises a valid role and a permission granted for the tenant device, and the tenant identifier associated with the tenant device;
- determining whether the access token which authorizes the tenant device to access the cloud service is successfully verified; and
- generating the ticket indicating that the tenant is authorized to access the application associated with the cloud service when the access token is successfully verified.

7. The method of claim 1, wherein the ticket is in a format compatible with the third-party server.

8. The method of claim 1, wherein the transmitting of the ticket comprises:
- determining an application configured to deliver the requested cloud service from a plurality of applications using the unique identifier associated with the cloud service;
- determining a third-party server which hosts the determined application from a plurality of third-party servers connected to the cloud computing system; and
- transmitting the ticket to the determined third-party server communicatively coupled to the cloud computing system.

9. The method of claim 1, wherein the providing of the access comprises:
- receiving at least one visual representation of data from the application hosted on the third-party server in response to the successful validation of the ticket; and
- rendering the received visual representation of data on a graphical user interface of the tenant device.

10. The method of claim 9, wherein the receiving of the at least one visual representation of data comprises:
- receiving a request to retrieve time-series data associated with at least one asset stored in a time-series database from the application associated with the requested cloud service;
- retrieving the time-series data associated with the at least one asset from the time-series database based on the received request;
- providing the retrieved time-service data associated with the at least one asset to the third-party server;
- receiving the visual representation of the processed time-series data from the application associated with the requested cloud service; and
- rendering the visual representation of the processed time-series data on the graphical user interface of the tenant device.

11. The method of claim 10, wherein the retrieving of the time-series data comprises:
- accessing an appropriate application programming interface (API) configured for retrieving the time-series data associated with the at least one asset based on the received request; and
- retrieving the time-series data associated the at least one asset from the time-series database in response to accessing the respective API.

12. The method of claim 10, wherein the providing of the retrieved time-series data comprises:
- analyzing the retrieved time-series data associated with the at least one asset using at least one analytics algorithm; and
- sending result of analysis along with the analyzed time series data to the third-party server.

13. The method of claim 1, wherein the providing of the access comprises:
- providing access to the application without logging in by the tenant to access the application by the third-party server.

14. The method of claim 1, wherein the application is a visual analytics application, and
- wherein the cloud service is a data analytics and visualization service.

15. A cloud computing system comprising:
- one or more processors; and
- at least one accessible memory coupled to the one or more processors, wherein the at least one accessible memory comprises a cloud computing platform stored in a form of machine-readable instructions and executable by the one or more processors,
- wherein the cloud computing platform is configured to:
  - receive a request to access a cloud service hosted on the cloud computing system from a tenant device of a tenant, wherein the request comprises a tenant identifier associated with the tenant device and a unique identifier associated with the requested cloud service, wherein the requested cloud service is accessible via an application hosted on a third-party server communicatively coupled to the cloud computing system;

authenticate the tenant device to access the requested cloud service via the application based on the tenant identifier and the unique identifier associated with the cloud service;

generate a ticket indicating that the tenant device is authorized to access the application, wherein the ticket comprises a unique identifier associated with the application associated with the requested cloud service;

transmit the ticket to the third-party server communicatively coupled to the cloud computing system; and provide access to the cloud service to the tenant via the application hosted on the third-party server in response to successful validation of the ticket by the third-party server.

16. A system comprising:

a cloud computing system configured to provide secure access to at least one cloud service;

a third-party server comprising one or more applications, wherein the third-party server is communicatively coupled to the cloud computing system; and one or more tenant devices communicatively coupled to the cloud computing system, wherein the one or more tenant devices are configured to access the cloud service via the one or more applications hosted on the third-party server, wherein the cloud computing system is configured to:

receive a request to access a cloud service of the at least one cloud service hosted on the cloud computing system from a tenant device of the one or more tenant devices, wherein the request comprises a tenant identifier associated with the tenant device and a unique identifier associated with the requested cloud service, wherein the requested cloud service is accessible via the one or more applications hosted on the third-party server;

authenticate the tenant device to access the requested cloud service via the application based on the tenant identifier and the unique identifier associated with the requested cloud service;

generate a ticket indicating that the tenant device is authorized to access the application, wherein the ticket comprises a unique identifier associated with the application associated with the requested cloud service;

transmit the ticket to the third-party server; and provide access to the requested cloud service to the tenant device via the application hosted on the third-party server in response to successful validation of the ticket by the third-party server.

17. The system of claim 16, wherein the third-party server is configured to re-authenticate the tenant device by validating the ticket indicating that the tenant device is authorized to access one of the applications.

* * * * *